United States Patent [19]
Taketsugu

[11] Patent Number: 5,875,292
[45] Date of Patent: Feb. 23, 1999

[54] PACKET TRANSMISSION METHOD WITHOUT SENDING SERIAL NUMBERS

[75] Inventor: Masanori Taketsugu, Tokyo, Japan

[73] Assignee: NEC Corporation, Tokyo, Japan

[21] Appl. No.: 780,297

[22] Filed: Jan. 8, 1997

Related U.S. Application Data

[63] Continuation-in-part of Ser. No. 600,158, Feb. 12, 1996, abandoned.

[30] Foreign Application Priority Data

Feb. 10, 1995 [JP] Japan .................................. 7-022528

[51] Int. Cl.$^6$ .............................. H04L 1/08; H04L 25/493
[52] U.S. Cl. ................................ 395/182.16; 395/182.18; 371/32; 370/474
[58] Field of Search ........................ 395/182.16, 182.14, 395/182.18, 824, 840, 850; 371/31, 32, 33, 34, 35; 370/471, 472, 473, 474

[56] References Cited

U.S. PATENT DOCUMENTS

| | | | |
|---|---|---|---|
| 3,624,613 | 11/1971 | Smith | 395/182.14 |
| 4,617,657 | 10/1986 | Drynan | 370/60 |
| 4,621,323 | 11/1986 | Mayhew | 364/200 |
| 4,641,274 | 2/1987 | Swank | 707/531 |
| 4,654,480 | 3/1987 | Weiss | 380/48 |
| 4,672,543 | 6/1987 | Matsui et al. | 395/200.65 |
| 4,691,314 | 9/1987 | Bergins | 370/94 |
| 4,697,281 | 9/1987 | O'Sullivan | 379/59 |
| 4,999,834 | 3/1991 | Leo et al. | 370/94.1 |
| 5,163,055 | 11/1992 | Lee | 371/32 |
| 5,282,238 | 1/1994 | Berland | 379/58 |
| 5,377,188 | 12/1994 | Seki | 370/85.1 |
| 5,425,025 | 6/1995 | Tahara | 370/60 |
| 5,426,638 | 6/1995 | Maruyama et al. | 370/85.4 |
| 5,477,541 | 12/1995 | White et al. | 370/94.1 |
| 5,483,526 | 1/1996 | Ben-Nun et al. | 370/60.1 |

FOREIGN PATENT DOCUMENTS

| | | |
|---|---|---|
| 393314 | 10/1990 | European Pat. Off. . |
| 441960 | 8/1991 | European Pat. Off. . |
| A0726685 | 8/1996 | European Pat. Off. . |
| 215152 | 12/1983 | Japan . |
| A1428050 | 3/1976 | United Kingdom . |
| A1448178 | 9/1976 | United Kingdom . |

OTHER PUBLICATIONS

L. Wei et al., "A New Selective Retransmitted ARQ System," 1993 IEEE, Nov. 29, 1993, pp. 1815–1821.

*Primary Examiner*—Dieu-Minh Le
*Attorney, Agent, or Firm*—Sughrue, Mion, Zinn, Macpack & Seas, PLLC

[57] ABSTRACT

To enable data transmission without transmitting packer's serial numbers, a transmit serial number is incremented by one at a transmit site each time a serial numberless data packet is sent to a receive site, and a copy of the transmitted packet is stored in a transmit memory corresponding to the transmit serial number. The process is repeated so that a predetermined number of outstanding packets are transmitted. At the receive site, a receive serial number is incremented by one upon receipt of each packet and the packet is stored in a receive memory corresponding to the receive serial number. The receive site determines whether there is an error in the outstanding packets in the receive memory. If an error is found, the receive site sends a request packet containing the serial number of the packet in error to the transmit site. In response, the transmit site sends a replacement copy for the corrupted packet to the receive site which, in response, replaces the packet in error with the received copy. If no packet in error is found in the receive memory, the receive site transmits an acknowledgment to the transmit site. On receiving it, the transmit site repeats the transmission of the next sequence of outstanding serial numberless packets.

14 Claims, 4 Drawing Sheets

MOBILE STATION

CELL-SITE STATION

PACKET TRANSMISSION METHOD WITHOUT SENDING SERIAL NUMBERS

This is a continuation-in-part of application Ser. No. 08/600,158, filed Feb. 12, 1996, now abandoned.

BACKGROUND OF THE INVENTION

1. Field of the Invention

The present invention relates generally to data communications, and more specifically to a cellular mobile communication system where mobile data terminals send and receive packets to and from cell-site stations.

2. Description of the Related Art

Recent proliferation of personal devices for cellular mobile communication networks have created a need to communicate computer data over radio links in a packet-switched mode, rather than in a circuit-switched mode, for efficient utilization of network resources. In data communication systems, the international standard X.25 specifies that three-bit serial numbers be contained in each data packet to indicate the transmit and receive sequences together with a format identifier and a logical channel number and so fort. According to the X.25 standard, a predetermined number of data packets are transmitted in sequence from a transmit site to a receive site. These packets are called "outstanding" because the transmit site receives no acknowledgment during the transmission of these packets. If the receive site ails to receive any of the outstanding packets it returns no acknowledgment. Following the transmission of all outstanding packets, the transmit site begins a timing operation. If no acknowledgment is received within the period of the timing operation, the transmit site determines that an error has occurred in the transmitted packets, and retransmits their copies although not all of the previous packets have been corrupted.

If the protocols of the current standard for packet switched network are employed, the throughput of a connection established in the cellular network will be significantly low due to the relatively low transmission speed of the radio link. Another factor that would affect the throughput is the amount of data contained in the packet header since powerful error control bits would be needed to ensure against the loss of any single bit. Furthermore, the conventional retransmission scheme would increase radio traffic and hence place further limitations on the throughput. It is thus important to reduce the amount of housekeeping data in the packet header.

SUMMARY OF THE INVENTION

It is therefore an object of the present invention to provide a data communication method that enables a high throughput over low-speed communications links by not transmitting serial numbers which are conventionally used to establish the identity of transmitted packets.

According to a first aspect of the present invention, there is provided a method for transmitting data packets from a transmit site to a receive site without containing serial numbers of the data packets, comprising the steps of:

a) transmitting a data packet from the transmit site to the receive site, incrementing a serial number by 1 at the transmit site and storing a copy of the transmitted data packet in a storage location of a transmit memory corresponding to the serial number;

b) repeating the step (a) a predetermined number of times;

c) receiving each data packet of the step (a) at the receive site, incrementing a serial number by 1 and storing the received data packet in a storage location of a receive memory corresponding to the serial number; and d) repeating the step (c) the same predetermined number of times as the step (b).

Preferably, following the step (d), the present invention provides the steps of:

e) determining whether there is a data packet in error in the receive memory;

f) if a data packet in error is found by the step (e), transmitting a request packet containing the serial number of the packet in error from the receive site to the transmit site;

g) receiving the request packet at the transmit site and transmitting to the receive site a copy of the data packet stored in the transmit memory in a location identified by the serial number contained in the request packet;

h) receiving the copy of data packet at the receive site and replacing the packet in error stored in the receive memory with the received copy and repeating the step (e);

i) if a data packet in error is not found by the step (e), transmitting an acknowledging packet from the receive site to the transmit site; and j) repeating the steps (a) to (i).

According to a second aspect of the present invention, there is provided a method for transmitting data packets from a transmit site to a receive site without containing serial numbers of the data packets, comprising the steps of:

a) setting a first transmit variable to 0 at the transmit site and setting a first receive variable to 0 at the receive site;

b) setting a second transmit variable to 0 at the transmit site;

c) transmitting a data packet from the transmit site to the receive site, incrementing the second variable by 1 and storing a copy of the transmitted data packet in a storage location of a transmit memory corresponding to a sum of the first and second transmit variables;

d) repeating the step (c) a predetermined number of times and incrementing the first transmit variable by an amount corresponding to predetermined number;

e) setting a second receive variable to 0 at the receive site;

f) receiving each data packet of the step (c) at the receive site, incrementing the second receive variable by 1 and storing the received data packet in a storage location of a receive memory corresponding to a sum of the first and second receive variables;

g) repeating the step (f) said predetermined number of times and incrementing the first receive variable by an amount corresponding to the same predetermined number as that of the step (d).

Preferably, following the step (g), the present invention provides the steps of:

j) determining whether there is a data packet in error in the receive memory;

k) if a data packet in error is found by the step (j), transmitting a request packet containing a sum of the first and second receive variables from the receive site to the transmit site;

l) receiving the request packet at the transmit sire and transmitting to the receive site a copy of the data packet stored in the transmit memory in a location identified by the sum contained in the request packet;

m) receiving the copy of data packet at the receive site and replacing the packet in error stored in the receive memory with the received copy and repeating the step (j);

n) if a data packet in error is not found by the step (j), transmitting an acknowledging packet from the receive site to the transmit site; and o) receiving the acknowledgment packet at the transmit site and repeating the steps (b) to (h).

BRIEF DESCRIPTION OF THE DRAWINGS

The present invention will be described in further detail with reference to the accompanying drawings, in which.

DETAILED DESCRIPTION

Figure 1:
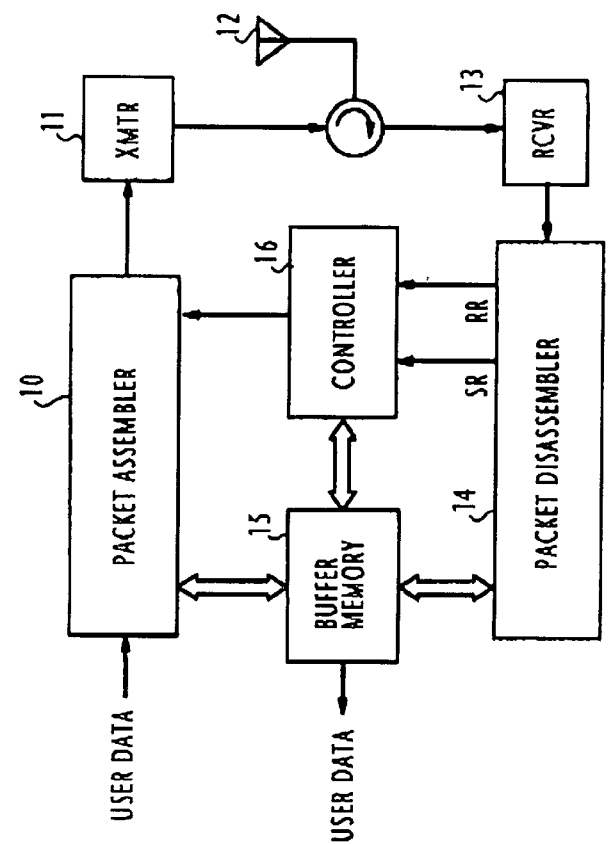
FIG. 1 is a block diagram of a cell-site station of a mobile communication network.

In FIG. 1, there is shown a cell-site station of a cellular mobile communication system according to the present invention. The cell-site base station includes a packet assembler 10 where user data are assembled into a packet and applied to a transmitter 11 where it is converted to a radio frequency signal for transmission on a forward channel from antenna 12 to a mobile station. A copy of the transmitted packet is stored in a buffer memory 15 for retransmission in the event of an error. Signals on a reverse channel from the mobile station are received by antenna 12, converted to baseband by receiver 13 and supplied to a packet disassembler 14 where each packet is disassembled. Controller 16 provides memory management on buffer memory 15 so that copies of user data transmitted are stored in sequence for purposes of retransmission and provides an error check on the mobile-transmitted user data. If a bit error exists, it directs the packet assembler 10 to send a return message indicating the serial number of a packet in error, otherwise it directs the packet assembler to acknowledge receipt of a sequence of packets by sending to the mobile station a "receive ready" packet. At appropriate timing, the mobile-transmitted user data in memory 15 are read out into utilization circuitry, not shown. Controller 16 includes error checking circuitry, not shown, to check for the presence of any packet in memory 15 which has been corrupted during transmission.

Figure 2:
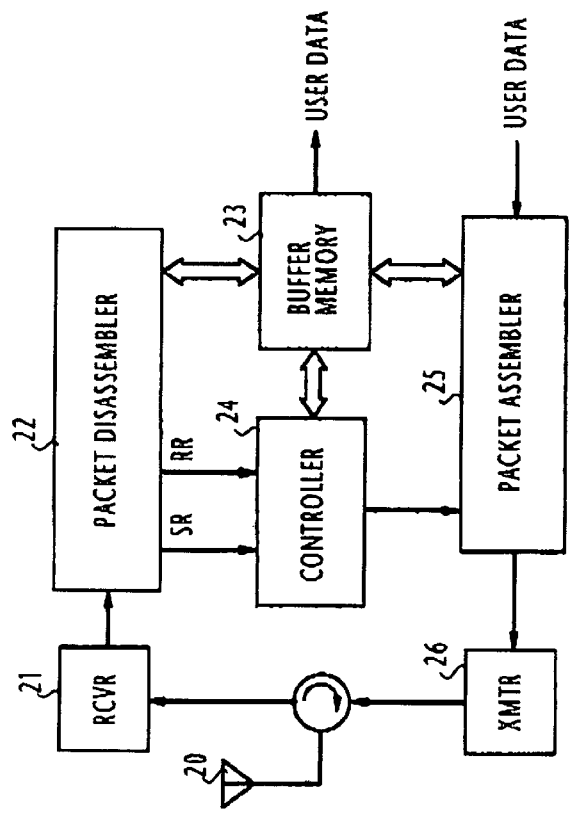
FIG. 2 is a block diagram of a mobile station of the mobile communication network.

As shown in FIG. 2, the cellsite-transmitted signal is received by antenna 20 of a mobile station and converted to baseband by a receiver 21 and fed to a packet disassembler 22 where the packet is disassembled and its contents are analyzed. The user data contained in the disassembled packet is stored into a buffer memory 23 under control of a controller 24. A utilization circuit, not shown, is connected to the buffer memory 23 to read user data therefrom at appropriate timing. User data from mobile station is applied to a packet assembler 25 where it is assembled into a packet. The packet from the mobile station is converted to radio frequency by a transmitter 26 and transmitted from antenna 20 to the cell-site station. Controller 24 provides memory management on buffer memory 23 so that copies of mobile-transmitted user data are stored in sequence for purposes of retransmission and provides an error check on the cellsite-transmitted user data. If a bit error exists in a predetermined number of cellsite-transmitted packets, controller 24 directs the packet assembler 25 to send a return message (selective ready packet) indicating the serial number of a damaged packet, otherwise it directs the packet assembler 25 to acknowledge receipt of a sequence of packets. Controller 24 includes error checking circuitry, not shown, to check for the presence of any packet in memory 23 which has been corrupted during transmission.

Figure 3:
FIG. 3 shows die data format of packets used in the network.

As shown in FIG. 3, the packet transmitted over the forward and reverse channels of the cellular network contains a channel header, a logical channel number field, a user data field and a frame check sequence. User data is inserted in the user data field. No serial number is transmitted by packets. Packet assemblers at both cell-site and mobile stations provide assembling of a data packet according to the format of FIG. 3, and packet disassemblers of both stations provide disassembling of a received packet into constituent components for channel identification and error check.

Figure 4:
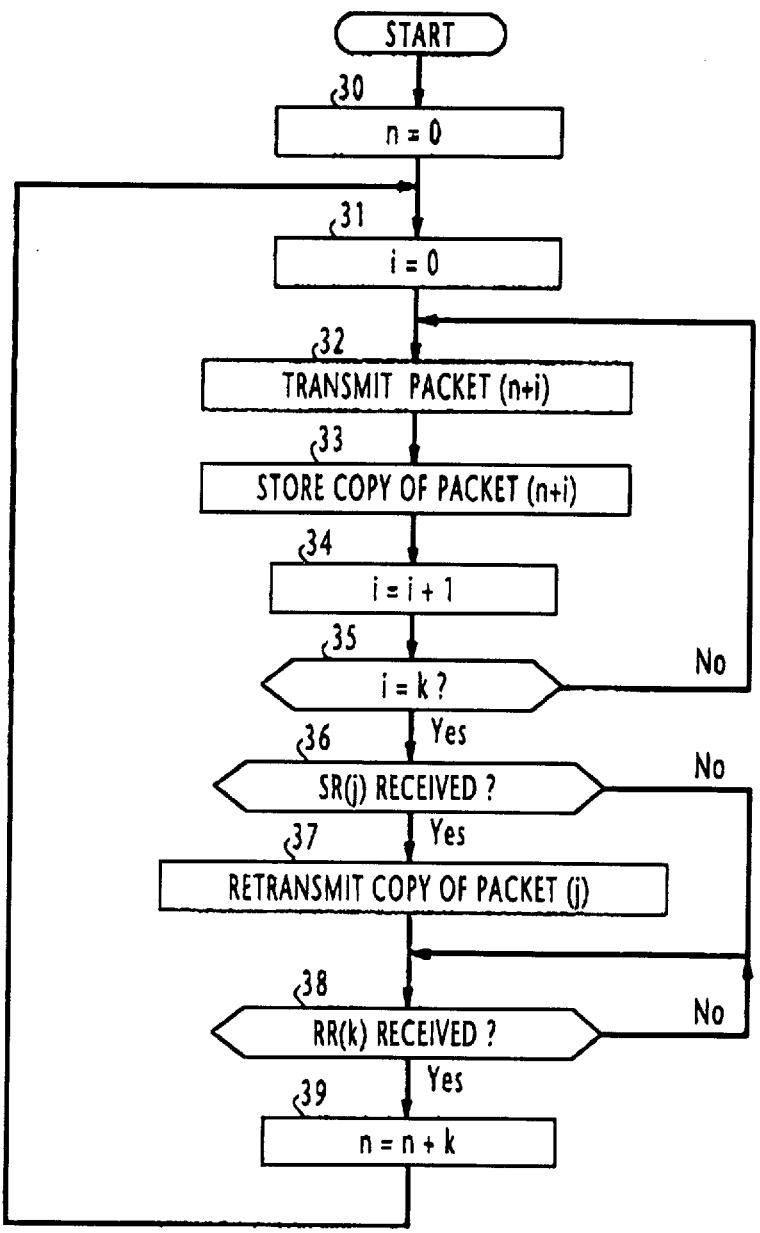
FIG. 4 is a flowchart of operations performed by the controller of the cell-site station.

The operation of controller 16 at cell-site station during a transmit mode is illustrated in FIG. 4. When transmitting data traffic to a mobile station, a first variable n is set to 0 at block 30 and a second variable i is set to 0 at block 31. A sum of the variables n+i indicates the serial number of a data packet sent to the mobile station. Controller 16 commands the packet assembler 10 to assemble and transmit a data packet (block 32) and stores a copy of the transmitted packet into the buffer memory 15 (block 33) in a storage location identified by the serial number n+i. Variable i is incremented by 1 at block 34 and is checked at block 35 to see if it is equal to k, (where k is the maximum number of outstanding packets waiting to be acknowledged). If i is not equal to k, flow returns to block 32 to transmit the next packet. These k outstanding packets are sequentially transmitted at periodic intervals to the mobile station and copies of the corresponding packets are stored in memory 15.

Flow proceeds to block 36 to check for the presence of a selective reject packet SR(j) from the mobile station, requesting retransmission of packet (j) which has been corrupted or lost during transmission, where j identifies the serial number of the packet in error or lost. If the decision is affirmative at block 36, flow proceeds to block 37 to fetch the copy of the requested packet from the location of memory 15 identified by the serial number contained in the requesting packet, and transmit it to the mobile station. Following block 37 or negative decision of block 36, decision block 38 is executed to check for the presence of a receive ready packet RR(k) from the mobile station, acknowledging receipt of a sequence of k packets and signaling that the mobile station is ready to accept the next sequence. If the acknowledging packet is received, flow proceeds from block 38 to block 39 to set the variable n equal to n+k and returns to block 31 to start sending the next sequence of k packets.

Figure 5:
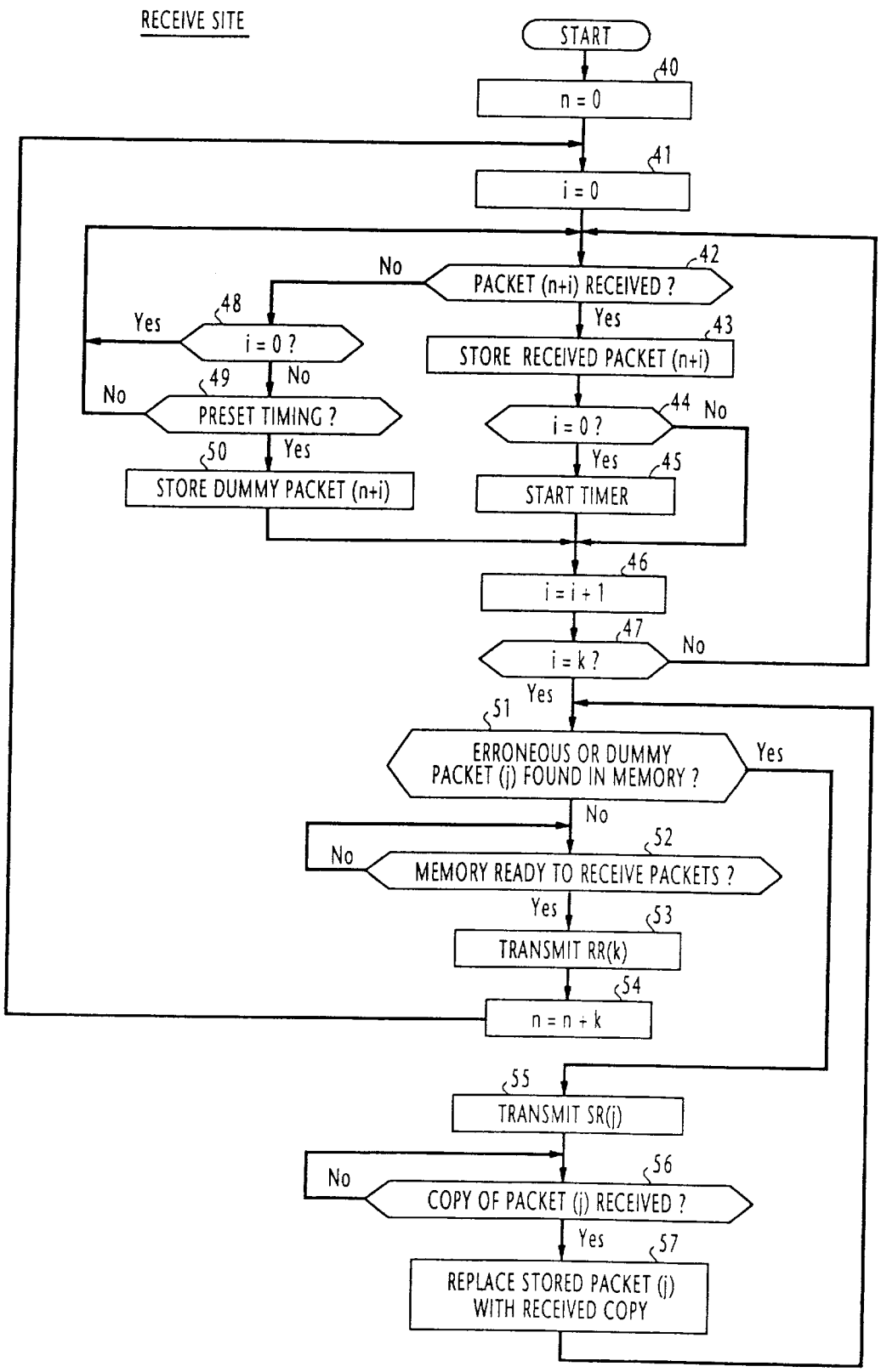
FIG. 5 is a flowchart of operations performed by the controller of the mobile station.

The operation of the mobile controller 24 during a receive mode is illustrated in FIG. 5. During the receive mode, mobile controller 24 sets variables n and i to 0 at blocks 40 and 41, respectively. At block 42, controller 24 checks for the presence of a data packet from the transmit site. If there is none, flow proceeds to block 48 to determine if i=0. If i=0, blocks 42 and 48 are repeated to monitor the arrival of a first packet. If a first packet is received, flow proceeds from block 42 to block 43 to store the received packet in the buffer memory 23 and flow proceeds to block 44. If variable i is 0 at block 44, flow proceeds to block 45 to start a timer so that it starts producing a preset timing signal at predetermined intervals corresponding to the intervals at which data packets are received. Flow proceeds to block 46 to increment the variable i by 1. At block 47, the serial number represented by variable i is checked to see if it is equal to k. If not, flow returns to block 42 to repeat the above process until variable i is incremented to k.

During an interval between arrivals of successive packets once a first data packet is received, the mobile station loops through blocks 42, 48 and 49 to monitor the arrival of a packet until a timing signal is produced by the timer at block 49. If the mobile site fails to receive a packet at preset timing, the decision at block 49 is positive and flow proceeds to block 50 to store a dummy packet in a storage location of its memory corresponding to variable i+1 and variable i is then incremented by 1 at block 46.

When i is incremented to k, flow proceeds from block 47 to block 51, where the mobile site searches through its memory for a data packet in error or a dummy packet. If the decision at block 51 is negative, flow proceeds to block 52 to determine whether the memory 23 is ready to receive the next sequence of k packets, and if so, it proceeds to block 53 to transmit a receive ready packet RR(k) to acknowledge the receipt of k packets. Receive site sets the variable n equal to n+k at block 54 and returns to block 41 to repeat the above process for the next sequence of k packets.

If there is an erroneous or dummy packet (j) in memory 23, the decision at block 51 is affirmative and the mobile station proceeds to block 55 to transmit a selective reject packet SR(j) to the transmit site, requesting it to retransmit a copy of the data packet identified by the serial number j contained in the packet SR(j). If a copy of the data packet (j) is received (block 56), the mobile station proceeds to block 57 to replace the stored erroneous or dummy packet (j) with the received copy of the packet (j), and flow returns to block 51 to provide an error check on the retransmitted packet.

Figure 6:
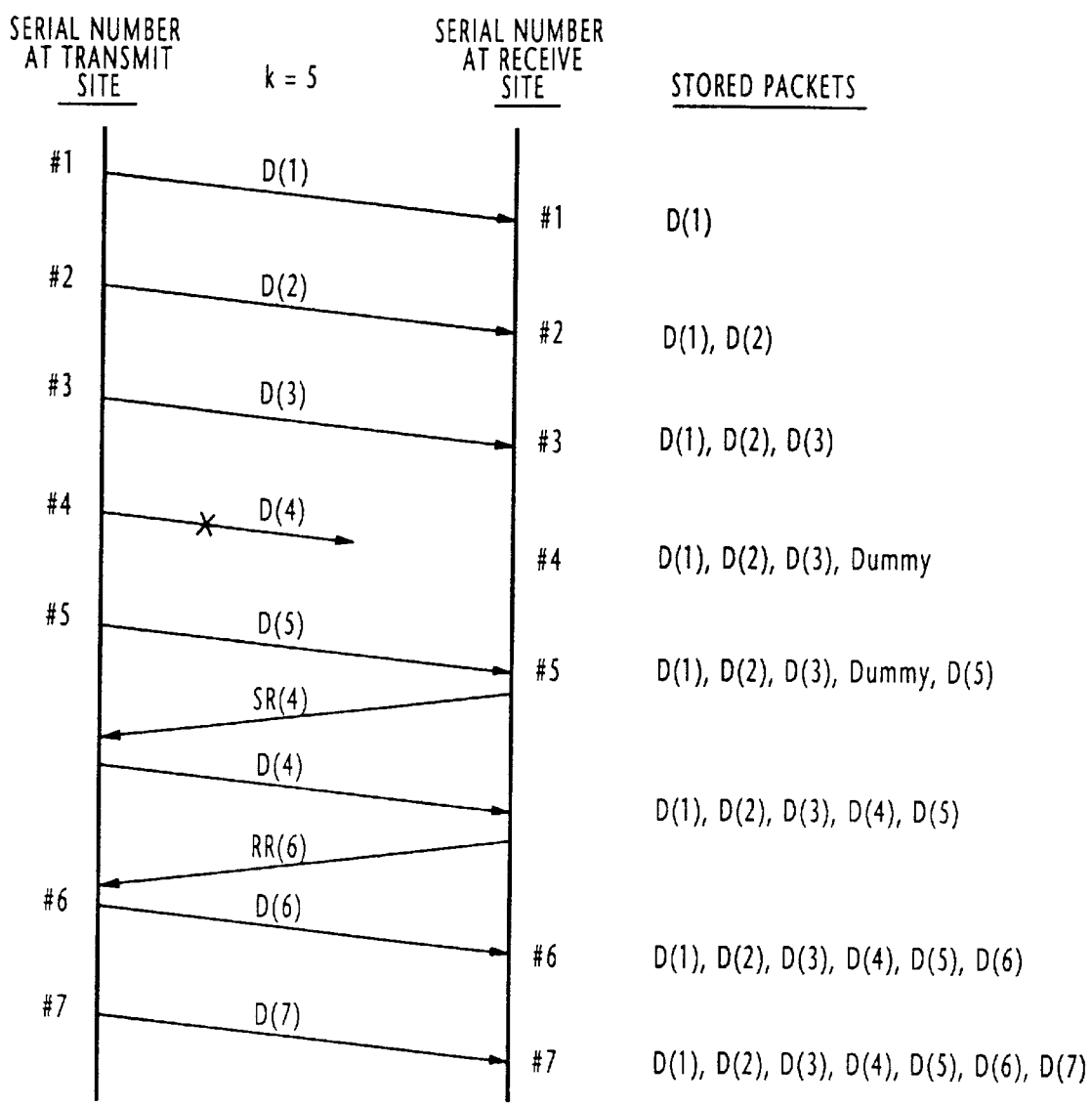
FIG. 6 is a sequence diagram illustrating a sequence of packets exchanged between transmit and receive sites.

Assume that k=5, and the cell-site station starts sending packets beginning with D(1). The mobile station increments the serial number represented by the sum of variables n+i in response to packets D(1) to D(5) as illustrated in FIG. 6. The serial numbers of both transmit and receive sites are incremented synchronously to #5. If data packet D(4) is completely corrupted and the mobile station fails to receive it, an error check at block 51 by controller 24 results in the transmission of a packet SR(4) requesting a retransmission. On receiving the packet SR(4), the cell-site station retransmits a copy of packet D(4) stored in memory 15. In response to receipt of the copy of packet D(4), the mobile station replaces the dummy packet in memory 23 with the retransmitted packet D(4) and sends an RR(5) packet if the memory 23 is ready to receive packets. The cell-site controller 15 responds to packet RR(5) by incrementing variable n by 5 at block 39 and returns to block 31 to restart sending the next sequence of data packets.

When user data is transmitted on a reverse channel, the mobile station performs the process of FIG. 4 and the cell-site station performs the process of FIG. 5.

What is claimed is:

1. A method for transmitting data packets from a transmit site to a receive site, wherein said data packets are transmitted without express and without implicit serial number information as part of said data packets, said method comprising the steps of:

a) transmitting one of said data packets from the transmit site to the receive site, incrementing a serial number by 1 at the transmit site and storing a copy of the transmitted one of said data packets in a storage location of a transmit memory corresponding to the serial number;

b) repeating the step (a) a predetermined number of times;

c) receiving each of said data packets of the step (a) at the receive site, incrementing a serial number by 1 and storing the received one of said data packets in a storage location of a receive memory corresponding to the serial number; and d) repeating the step (c) said predetermined number of times.

2. A method as claimed in claim 1, following the step (d), further comprising the steps of:

e) determining whether there is a data packet in error in the receive memory;

f) if a data packet in error is found by the step (e), transmitting a request packet containing the serial number of the packet in error from the receive site to the transmit site;

g) receiving the request packet at the transmit site and transmitting to the receive site a copy of the data packet stored in the transmit memory in a location identified by the serial number contained in the request packet;

h) receiving the copy of the data packet at the receive site and replacing the packet in error stored in the receive memory with the received copy and repeating the step (e);

i) if a data packet in error is not found by the step (e), transmitting an acknowledging packet from the receive site to the transmit site; and j) repeating the steps (a) to (i).

3. A method as claimed in claim 1, wherein the transmit and receive sites are located in a cellular mobile communication network.

4. A method for transmitting data packets from a transmit site to a receive site wherein said data packets are transmitted without accompanying serial number information as part of said data packets, said method comprising the steps of:

a) setting a first transmit variable to 0 at the transmit site and setting a first receive variable to 0 at the receive site;

b) setting a second transmit variable to 0 at the transmit site;

c) transmitting one of said data packets from the transmit site to the receive site, incrementing the second variable by 1 and storing a copy of the transmitted one of said data packets in a storage location of a transmit memory corresponding to a sum of the first and second transmit variables;

d) repeating the step (c) a predetermined number of times and incrementing the first transmit variable by an amount corresponding to said predetermined number;

e) setting a second receive variable to 0 at the receive site;

f) receiving each of said data packets of the step (c) at the receive site, incrementing the second receive variable by 1 and storing the received one of said data packets in a storage location of a receive memory corresponding to a sum of the first and second receive variables; and g) repeating the step (f) said predetermined number of times and incrementing the first receive variable by an amount corresponding to said predetermined number.

5. A method as claimed in claim 4, following the step (g), further comprising the steps of:

h) transmitting an acknowledgment packet from the receive site to the transmit site if no error exists in the packets stored in the receive memory; and i) receiving the acknowledgment packet at the transmit site and repeating the steps (b) to (h).

6. A method as claimed in claim 4, following the step (g), further comprising the steps of:

j) determining whether there is a data packer in error in the receive memory;

k) if a data packet in error is found by the step (j), transmitting a request packet containing a sum of said first and second receive variables from the receive site to the transmit site;

l) receiving the request packet at the transmit site and transmitting to the receive site a copy of the data packet stored in the transmit memory in a location identified by said sum contained in the request packet;

m) receiving the copy of data packet at the receive site and replacing the packet in error stored in the receive memory with the received copy and repeating the step (j);

n) if a data packet in error is not found by the step (j), transmitting an acknowledging packet from the receive site to the transmit site; and o) receiving the acknowledgment packet at the transmit site and repeating the steps (b) to (g).

7. A method as claimed in claim 4, wherein the transmit and receive sites are located in a cellular mobile communication network.

8. A method for transmitting data packets from a transmit site to a receive site, wherein said data packets are transmitted without express and without implicit serial number information as part of said data packets, said method comprising the steps of:

a) transmitting one of said data packets from the transmit site to the receive site, incrementing a serial number by 1 at the transmit site and storing a copy of the transmitted one of said data packets in a transmit memory;

b) repeating the step (a) a predetermined number of times;

c) receiving each of said data packets of the step (a) at the receive site, incrementing a serial number by 1 and storing the received one of said data packets in a receive memory;

d) repeating the step (c) until the serial number equals said predetermined number;

e) searching the receive memory for detecting a data packet in error; and f) transmitting the serial number of the data packet in error to the transmit site to request for retransmission of a copy of a data packet corresponding to the transmitted serial number, receiving said copy and replacing the data packet in error with the received copy.

9. A method for transmitting data packets from a transmit site to a receive site, wherein said data packets are transmitted without express and without implicit serial number information as part of said data packets, said method comprising the steps of:

a) transmitting one of said data packets from the transmit site to the receive site, incrementing a serial number by 1 at the transmit site and storing a copy of the transmitted one of said data packets in a transmit memory;

b) repeating the step (a) a predetermined number of times;

c) receiving each of said data packets of the step (a) at the receive site, incrementing a serial number by 1 and storing the received one of said data packets in a receive memory;

d) repeating the step (c) until the serial number equals said predetermined number;

e) determining whether there is a data packet in error in said receive memory;

f) if it is determined that there is no data packet in error, requesting the transmit site to repeat the steps (a) and (b) when said receive memory is not full; and g) if it is determined that there is a data packet in error, transmitting the serial number of the data packet in error to the transmit site to request for retransmission of a copy of a data packet corresponding to the transmitted serial number, receiving said copy and replacing the data packet in error with the received copy.

10. A method for transmitting data packets from a transmit site to a receive site, wherein said data packets are transmitted without accompanying serial number information as part of said packets, said method comprising the steps of:

a) transmitting one of said data packets from the transmit site to the receive site, incrementing a serial number by 1 at the transmit site and storing a copy of the transmitted one of said data packets in a transmit memory;

b) repeating the step (a) a predetermined number of times;

c) receiving one of said data packets of the step (a) at the receive site, incrementing a serial number by 1, storing the received one of said data packets in a receive memory, and starting a timer;

d) receiving a subsequent one of said data packets of the step (a) at the receive site, incrementing the serial number by 1, and storing the received subsequent one of said data packets in said receive memory;

e) storing a dummy packet in said receive memory if the receive site fails to receive said subsequent one of said data packets at predetermined timing specified by said timer and incrementing the serial number by 1;

f) repeating the steps (d) and (e) until the serial number of the receive site equals said predetermined number;

g) searching through the receive memory for detecting a dummy packet; and h) transmitting, to said transmit site, the serial number of the detected dummy packet to request for retransmission of a copy of a data packet corresponding to the transmitted serial number, receiving said copy and replacing the dummy packet in said memory with the received copy.

11. A method as claimed in claim 10 wherein the steps (g) and (h) further comprise the steps of:

searching through the receive memory for detecting an erroneous data packet; and transmitting, to said transmit site, the serial number of the detected erroneous packet to request for retransmission of a copy of a data packet corresponding to the transmitted serial number; and receiving said copy and replacing the erroneous packet in said memory with the received copy.

12. A method as claimed in claim 10 wherein the steps (g) and (h) further comprise the steps of:

determining whether there is a data packet in error in said receive memory;

if it is determined that there is no data packet in error, requesting the transmit site to repeat the steps (a) and (b) when said receive memory is not full; and if it is determined that there is a data packet in error, transmitting, to said transmit site, the serial number of the detected data packet in error to request for retransmission of a copy of a data packet corresponding to the transmitted serial number, receiving said copy and replacing the data packet in error with the received copy.

13. The method according to claim 4, wherein the data packet is transmitted without an explicit serial number and without information implicitly specifying a serial number accompanying the data packet.

14. The method according to claim 10, wherein the data packet is transmitted without an explicit serial number and without information implicitly specifying a serial number accompanying the data packet.

* * * * *

UNITED STATES PATENT AND TRADEMARK OFFICE
CERTIFICATE OF CORRECTION

PATENT NO. : 5,875,292
DATED : February 23, 1999
INVENTOR(S) : Masanori TAKETSUGU It is certified that error appears in the above-identified patent and that said Letters Patent is hereby corrected as shown below:

Column 1, line 22, delete "fort" and insert --forth--;

Column 1, line 27, delete "ails" and insert --fails--.

Column 3, line 15, delete "die" and insert --the--.

Signed and Sealed this

Tenth Day of August, 1999

Attest:

Q. TODD DICKINSON

Attesting Officer         Acting Commissioner of Patents and Trademarks